United States Patent [19] [11] B 3,916,175
Lauer et al. [45] Oct. 28, 1975

[54] PROGRAMMABLE DIGITAL FREQUENCY MULTIPLICATION SYSTEM WITH MANUAL OVERRIDE

[75] Inventors: Charles A. Lauer; Francis A. Fluet, both of Clarence, N.Y.

[73] Assignee: Westinghouse Electric Corporation, Pittsburgh, Pa.

[22] Filed: Aug. 29, 1973

[21] Appl. No.: 392,696

[44] Published under the Trial Voluntary Protest Program on January 28, 1975 as document no. B 392,696.

[52] U.S. Cl. .............................. 235/152; 235/151.11
[51] Int. Cl.² ....................... G06F 7/38; G06F 15/46
[58] Field of Search . 235/152, 156, 150.31, 151.11; 318/571, 573

[56] References Cited

UNITED STATES PATENTS

| | | | |
|---|---|---|---|
| 3,633,013 | 1/1972 | Dummermuth | 235/151.11 |
| 3,649,899 | 3/1972 | Dummermuth | 318/571 |
| 3,674,999 | 7/1972 | Kelling | 235/152 |

*Primary Examiner*—Malcolm A. Morrison
*Assistant Examiner*—David H. Malzahn
*Attorney, Agent, or Firm*—James J. Wood

[57] ABSTRACT

A digital frequency multiplication system for generating a pulse rate or frequency Fv which is a function of a desired machine velocity, and then deriving the component frequencies representative of the machine velocity along at least two orthogonal reference axes.

Linear interpolation control along the orthogonal axes is provided using digital differential analyzers having numerator shift registers receiving coded intelligence representative of displacement along these axes, and denominator shift registers for receiving coded intelligence representing the root of the sum of the square of the respective displacements along the reference axes.

Circular interpolation is provided along the reference orthogonal axes using digital differential analyzers having numerator shift registers which are a function of the displacement along the other axes, and denominator shift registers for receiving intelligence which is a function of the root of the sum of the squares of the displacements along the axes. The output of the digital differential analyzer is fed back to modify the numerator of the other digital differential analyzer as circular interpolation proceeds.

The ratio of N/D is less than unity. When violation of this relationship is impending, the coded intelligence of the larger of the displacements along a reference orthogonal axis is then entered into the D shift registers.

Manual override by an operator and for scaling of the weighted value of the output pulse train Fv provides further flexibility for the system.

7 Claims, 11 Drawing Figures

| PROGRAMMED IPM (IPMP) | DENOMINATOR VALUE (D) | PULSE WEIGHT OF Fv (INCHES/PULSE) | SCALE FACTOR |
|---|---|---|---|
| 0 to 99.99 | $D_1$ | 0.0001 | 1 |
| 100 to 199.99 | $2D_1$ | 0.0002 | 2 |
| 200 to 399.99 | $4D_1$ | 0.0004 | 4 |
| 400 to 799.99 | $8D_1$ | 0.0008 | 8 |
| 800 to 999.99 | $16D_1$ | 0.0016 | 16 |

(WHERE $D_1$ IS THE DENOMINATOR VALUE USED FOR SCALE-OF-ONE OPERATION).

| FRO (%) | IPM MAX | FRO MAX/FRO | DENOMINATOR $D_1$ |
|---|---|---|---|
| 120 | 10000 | 1.0000 | 10000 |
| 110 | 10000 | 1.0909 | 10909 |
| 100 | 10000 | 1.2000 | 12000 |
| 90 | 10000 | 1.3333 | 13333 |
| 80 | 10000 | 1.5000 | 15000 |
| 70 | 10000 | 1.7143 | 17143 |
| 60 | 10000 | 2.0000 | 20000 |
| 50 | 10000 | 2.4000 | 24000 |
| 40 | 10000 | 3.0000 | 30000 |
| 30 | 10000 | 4.0000 | 40000 |
| 20 | 10000 | 6.0000 | 60000 |
| 10 | 10000 | 12.0000 | 120000 |

FIG. 8
| MODE OF OPERATION | Nx | Dx | Ny | Dy |
|---|---|---|---|---|
| LINEAR | ΔX | RSS | ΔY | RSS |
| CIRCULAR | J | RSS | I | RSS |
| THREADCUTTING | I | $10^4$ | J | $10^4$ |
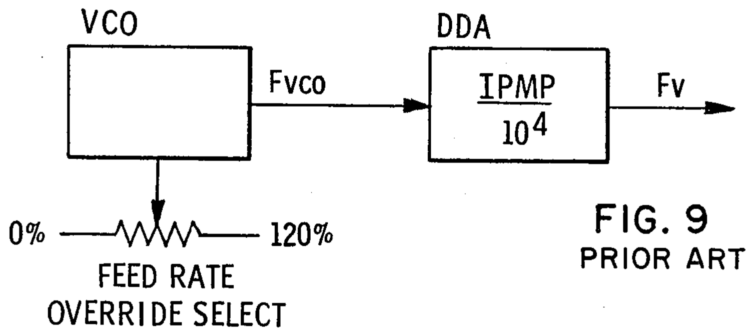
FIG. 9
PRIOR ART
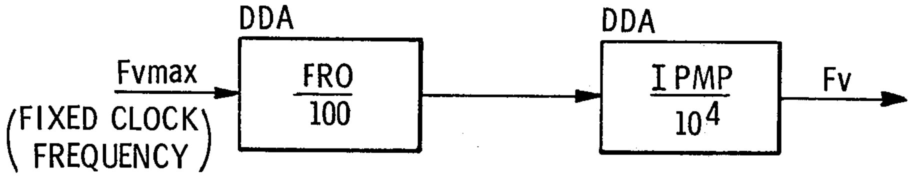
FIG. 10
PRIOR ART
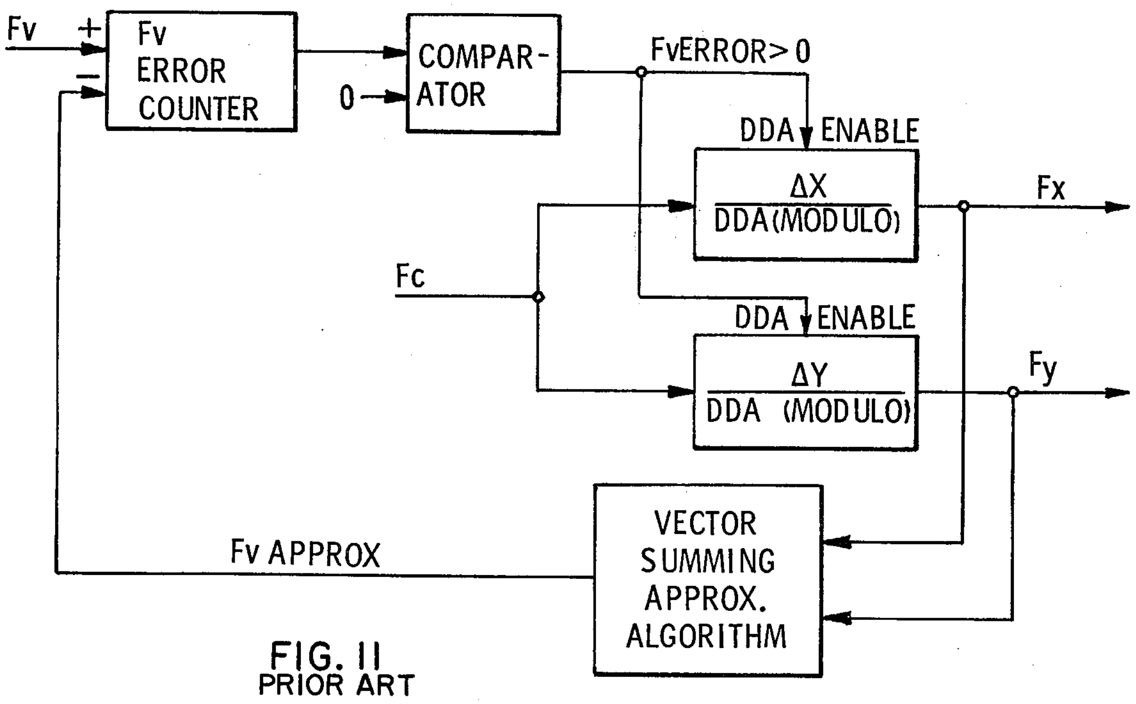
FIG. 11
PRIOR ART

PROGRAMMABLE DIGITAL FREQUENCY MULTIPLICATION SYSTEM WITH MANUAL OVERRIDE

BACKGROUND OF THE INVENTION

1. Field Of The Invention

This invention relates to the numerical control of machine tools and in particular to a digital frequency multiplication system.

2. Discussion Of The Prior Art

The classic digital differential analyzer (DDA) is described in "Arithmetic Operations In Digital Computers" by R.K Richards, pp 303–305, Van Nostrand Co., Inc. 1955. An improved DDA is described and claimed in U.S. Pat. No. 3,740,535 entitle "Numerical Contouring Control System" invented by Andras Szabo. This invention utilizes as one component the modified DDA of U.S. Pat. No. 3,740,535.

In describing the DDA, conventional nomenclature refers to one shift register as the integrand and the other shift register as the remainder. In this description, the magnitude of the integrand will be referred to as the numerator N and the capacity of the remainder register as the denominator D. Further, the term digital frequency multiplier will frequently be used as well as the term digital differential analyzer because in the main our interest is in digital frequency or pulse rate multiplication. (It should be recognized, of course, that the DDA is a frequency multipler.)

Improved techniques for numerical controls now permit programming the desired machine path velocity in direct speed dimensions. Once that velocity has been determined (this velocity path will be identified as the velocity vector $Fv$) it is converted into orthogonal component velocities for control purposes. U.S. Pat. No. 3,428,876 to Kelling describes a technique for so converting the commanded vector velocity; this technique will be discussed vis-a-vis the teachings of the instant invention.

SUMMARY OF THE INVENTION

A frequency multiplication system is disclosed having a first digital differential analyzer including a numerator shift register N and a denominator shift register D. Means are arranged for applying a constant frequency pulse train fc to the first digital differential analyzer. Means supply a maximum coded imput in the form of linear measure per unit time to the N shift register. Additional means apply a programmable input D to the D shift register which is a function of said maximum coded input to provide for scale of one to one weighted vector output velocity $Fv$ in accordance with:

$$Fv = fc \times N/D$$

Additional means are provided to provide a new denominator $2D_1$, $4D_1$ to provide a new weighted value of the output $Fv$.

Additionally, means are provided for selecting a percentage of the maximum coded input to provide manual override.

Additionally, the system is adapted for linear interpolation along at least two orthongonal axes by providing at least second and third differential analyzers each having $N_2N_3$ and $D_2D_3$ shift registers, repsectively. The pulse output $Fv$ is applied to the second and third differential analyzers. Means apply the programmed displacement along one orthogonal axis to the $N_2$ shift register. Similarly, means apply the programmed displacement along the other orthogonal axis to the $N_3$ shift register. Means are arranged for applying the square root of the sum of the squares of said programmed displacements RSS to the $D_2D_3$ shift registers whereby the outputs of the digital differential analyzers are:

$$F_{along\ one\ orthogonal\ axis} = fv \times N_2/D_2$$

and $$F_{along\ the\ other\ orthogonal\ axis} = Fv \times N_3/D_3.$$

Circular interpolation along at least two orthogonal axes ($x$, $y$) is also provided. At least second and third differential analyzers are provided having $N_2N_3$ and $D_2D_3$ shift registers, respectively. The output pulse train $Fv$ is again applied to the second and third differential analyzers. Means apply the progammed displacement along the $y$ orthogonal axis to the $N_2$ shift register. Means apply the programmed displacement along the $x$ orthogonal axis to the $N_3$ shift register. Means are arranged for supplying the square root of the sum of the squares $\sqrt{\Delta x^2 + \Delta y^2}$ (RSS) to the $D_2$ and $D_3$ shift registers whereby the outputs of the digital differential analyzers are:

$$Fx = \Delta y/RSS \times Fv;$$

$$Fy = \Delta x/RSS \times Fv.$$

Means couple back $Fx$ and $Fy$ to the $N_3$ and $N_2$ registers respectively, to modify the magnitude of the respective numerators $N_2$ and $N_3$ as circular interpolation progresses. Means are coupled to the shift registers $D_2$ and $D_3$ for comparing $\Delta x$ and $\Delta y$ with RSS, for changing the magnitude of RSS, i.e. the $D_2$ and $D_3$ shift registers whenever $$\Delta x \geqslant RSS$$

or $$\Delta y \geqslant RSS.$$

BRIEF DESCRIPTION OF THE DRAWINGS

FIG. 8 is a table summarizing the contents of the N and D register for various modes of operation: linear, circular and for thread cutting;

FIG. 9 is one prior art technique for generating the vector frequency $Fv$;

FIG. 10 is another prior art technique for generating the vector frequency $Fv$; and FIG. 11 is a prior art technique for generating the orthogonal component axial velocities for a vector velocity $Fv$.

GENERAL DESCRIPTION

Improved programming techniques for numerical controls now permit programming the desired machine path velocity in direct speed dimensions. For example, an F character followed by five digits may be used to set the machine speed from 000.01 to 999.99 inches per minute (IPM). The F value is modal, meaning that it is used until a new number is programmed. Previous methods required programming a number inversely proportional to the time required, a new number usually being required for every new motion command. In most control systems a feed rate override (FRO) is provided so that the machine operator can manually override the programmed speed command by selecting what percentage of the programmed speed will be utilized. The override selection varies usually from zero to one hundred and twenty percent with control being either continuous or in discrete steps throughout the interval.

In general, the programmed and manually selected parameters are used to generate a digital pulse rate or frequency which represents the desired velocity. This frequency will be called the vector frequency $Fv$. Typically each $Fv$ pulse represents one increment usually 0.0001 inch of vector or machine path motion. Further processing of the $Fv$ pulses provides the frequencies $Fx$ and $Fy$ to control the respective velocities along the orthogonal axes $x$ and $y$ (motion along the $z$ axis may also be controlled in three dimension situations, but in the interests of simplicity, this discussion will be confined to the $x$–$y$ plane).

DESCRIPTION OF THE PREFERRED EMBODIMENT

Conventional techniques used for generating $Fv$ employ either a voltage controlled oscillator (VCO) followed by a digital differential analyzer DDA as shown in FIG. 9 or two cascaded DDA as shown in FIG. 10. The frequency at the input to the final DDA determines the overall time resolution capability for the $Fv$ generator. A higher frequency input to the final DDA results in more accurate location of the $Fv$ pulses along the time axes. However, when the feed rate override is used to reduce the programmed speed, the instantaneous frequency error of $Fv$ will become larger. Further, in the FIG. 9 arrangement, thermal instabilities of the VCO creates errors in the generation of $Fv$.

Figures 1, 2, 3:
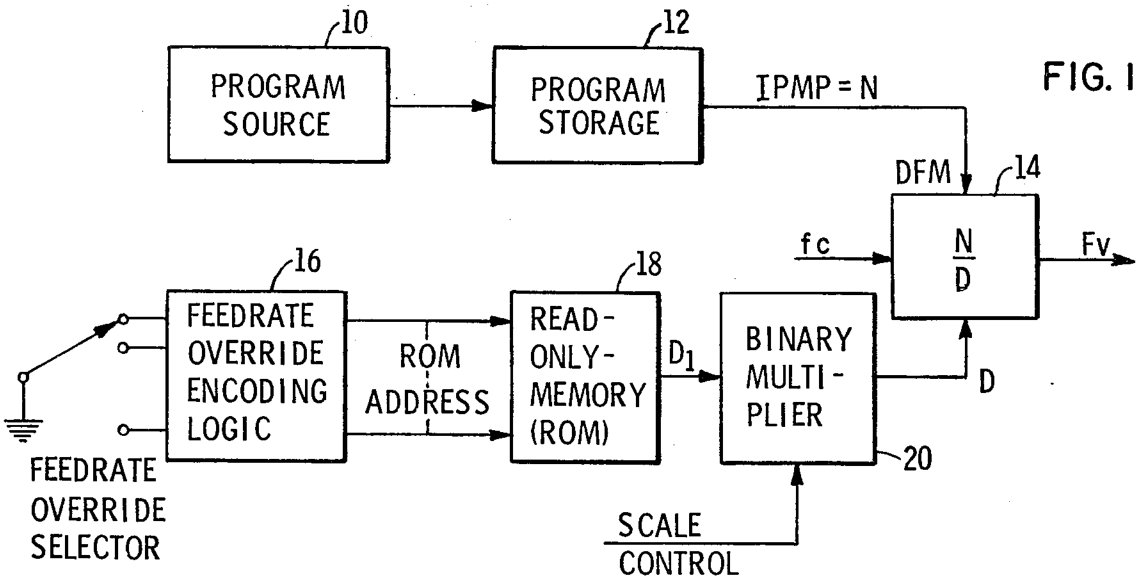
FIG. 1 is a block diagram of the vector frequency $Fv$ generator with manual override in accordance with the invention.
FIG. 2 is a table depicting the various parameters in the operation of the FIG. 1 configuration for various values of programmed IPM.
FIG. 3 is a table depicting denominator values $D_1$ for selected override percentages.

Referring now to FIG. 1, a program source 10 provides coded information which is transmitted to the program storage 12. The programmed value of the desired feed rate (IPMP) is supplied as the numerator N to the digital frequency multiplier 14.

The operator selects the override percentage which is transmitted to the encoding logic 16; this logic selects an address in the read only memory (ROM) 18 which then provides the proper denominator $D_1$ value. The $D_1$ number is applied to a binary multiplier 20 where it may be scaled before being supplied to the DFM 14. The DFM multiplies the constant frequency pulse train $fc$ to provide $Fv$:

$$fc \times N/D = Fv$$

In one practical application of this invention a five decimal digit format is used for the programmed feed rate in order to permit programming from 00000 to 99999 to represent the desired speeds of 000.00 to 999.99 inches per minute (IPM) at a resolution of 0.01 IPM. The programmed data is coverted to a binary number and stored in the N register.

The digital storage elements are 25 bit serial binary shift registers operating at 500 kilobits per second data rates. The maximum iteration or cycle rate is 20,000 cycles per second.

The clock pulses $fc$ and 20,000 pulses per second. If an $Fv$ pulse represents 0.0001 inches of vector motion, an $Fv$ of 20,000 pulses per second will represent 120 IPM. In order to achieve speeds greater than 120 IPM, without modifying the basic data bit rate, the D value is scaled, that is, it is multiplied by a binary scale factor; 2, 4, etc., and the weight of the $Fv$ pulse is changed accordingly (i.e. to 0.0002 inch, 0.0004 inch, etc. in the subsequent control circuitry). The scale factor that is used is dependent upon the programmed feed rate (IPM) as shown in the table of FIG. 2.

The denominator $D_1$ is a function the selection feed rate override:

$$D_1 = IPM\ max \times (FRO\ max/FRO)$$

Where:

$D_1$ = the denominator value for scale of one operation, $IPM\ max$ = 10,000 (the resolution of IPM max is the same as IPMP in the numerator), $FRO\ max$ = 120 percent, $FRO$ = the selected value of feed rate override in 10 percent steps from 10–120 percent.

The table of FIG. 3 lists the denominator values for various selected override rates (for an override of 0 percent, the operation of the DFM is inhibited so that no $Fv$ pulses are produced). As may be seen from a study of FIG. 2, the scale factors 1, 2, 4 cause some multiple of $D_1$ (the denominator for scale of one operation) to be used as the denominator D in the DFM 16, i.e. $D_1$, $2D_1$, $4D_1$, etc.

Additional storage capacity in the read only memory (ROM) can be used to modify the denominator D to accept various formats of input information. For example, the programmed feed rate may be in inches per minute (IPM) or millimeters per minute (MMPM). Additional stored denominator values may be selected to represent inches per revolution (IPR) in which case the input frequency $fc$ would be derived from a frequency representing the speed of revolution of a spindle, for example. The ROM can also be a source for numerator values for generating various fixed speeds for fast, medium and slow manual jog, or for other manual operational modes, such as incremental jog.

Automatic acceleration control can be provided with the addition of more control circuitry. For example, the N value can be linearly incremented over a period of time, by adding some number to the N register every iteration, until it equals the programmed IPM causing the $Fv$ frequency to increase linearly to the desired value.

Similarly, as the final machine position is approached, the N value can be iteratively decremented by some value to provide automatic deceleration control.

Generally in numerical contouring control systems, the desired machine vector velocity $Fv$ is accomplished by controlling its velocity (frequency) components $Fx$, $Fy$ along two or more orthogonal axes. In the $x$–$y$ plane for linear displacement, $Fx = Fv \cos \theta$ and $Fy = Fv \sin \theta$ where $\theta$ is the angle between $Fv$ and the $y$ axis.

Similarly, in circular displacement the components F$x$ and F$y$ are functions of the sine and cosine. A schematic diagram of the conventional approach to the generation of the component velocities is shown in FIG. 11. This is essentially the approach taken in U.S. Pat. No. 3,428,876. As will be seen, two digital differential analyzers, DDA's are sued with a vector feedback approximation (F$v$ approx) to provide the trigonometric conversion. The $x$ axis and the $y$ axis initial departures, $\Delta x$ and $\Delta y$ are described from the control input data. The denominator term of the DDA (DDA MODULO) refers to the capacity of the remainder register of the DDA.

In operation, a pulse from the F$v$ input is added to the F$v$ Error Counter enabling the operation of both DDA's to generate pulses at the F$x$ and F$y$ outputs. These outputs (F$x$, F$y$) are then summed using a vector sum approximation algorithm. The generated approximation of the vector frequency (F$v$ approx) is subtracted at the F$v$ Error Counter cancelling the input F$v$ and disabling the DDA's. This process is repeated for each F$v$ input pulse received. Since the denominator term of the DDA's is fixed, i.e. (DDA MODULO) the ratio of F$x$ and F$y$ will be the ratio of the two numerator terms $\Delta x$ and $\Delta y$. Since each pulse at F$x$ and F$y$ represents one increment of displacement on the respective axis, accurate linear motion is achieved. However, the accuracy of the rate of change of vector position, i.e. the vector velocity F$v$ is directly proportional to the accuracy of the vector summing approximation algorithm.

Figure 4:
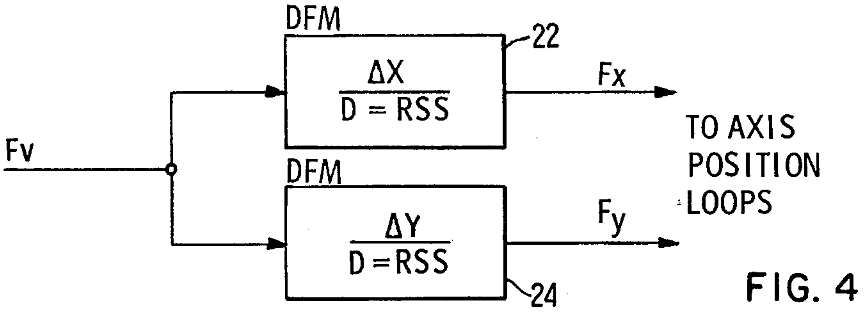
FIG. 4 is a block diagram showing the generation of the component orthogonal axial celocities (frequencies $Fx$, $Fy$) for linear interpolation.

Referring now to FIG. 4, the instant invention teaches the technique for achieving trigonometric frequency multiplication for linear displacement using two digital frequency multipliers DFM's 22 and 24. The numerator terms are $\Delta x$ and $\Delta y$, respectively; however, the denominator is RSS, i.e. the number derived from:

$$RSS = \sqrt{\Delta x^2 + \Delta y^2}$$

i.e. the vector length (RSS is an acronym derived from Root of Sum of Squares). The velocity accuracy is proportional to the accuracy of RSS with respect to the true vector length. The RSS calculation using the given $\Delta x$ and $\Delta y$ values need only be done once before the frequency multiplication process starts. This value can be calculated to any desired accuracy using a general numerical processor with a suitable iterative algorithm, thus eliminating the need for the feedback pulse summing algorithm hardware shown in FIG. 11. Since the calculation is performed once for each move programmed, the numerical processor is free to do other tasks while the frequency multiplication is taking place during motion.

In linear path control, the numerator term of both DFM's 22, 24 remain constant throughout the move. The arithmetic algorithm used to calculate the denominator RSS is arranged so that the RSS will always be initially larger than both numerator terms. This insures that the N/D ratio is less than unity.

Figures 5, 6:
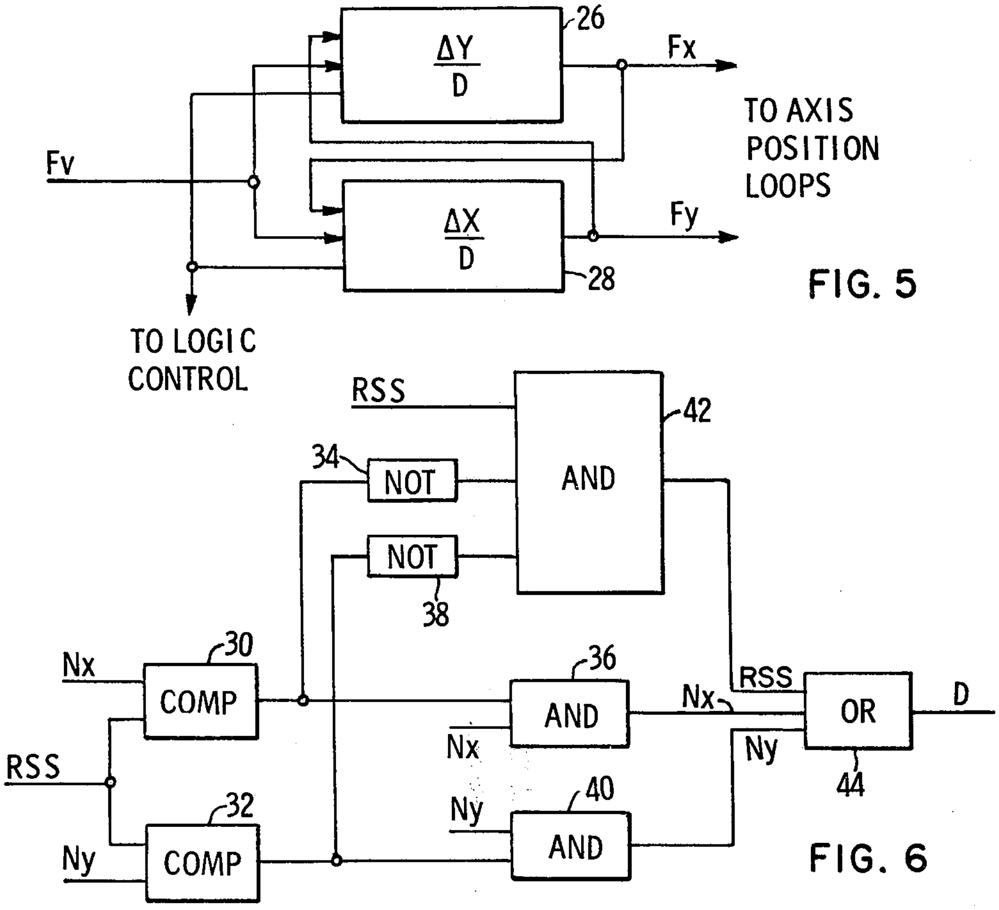
FIG. 5 is a block diagram showing the generation of the component orthogonal axial velocity (frequencies $Fx$, $Fy$) for circular interpolation using the sine-cosine mode algorithm.
FIG. 6 is a logic block diagram for controlliing the denominator D using the sine-cosine algorithm or the tangent and unity algorithm.

During circular path control, the numerator N of one DFM (FIG. 5:26) is modified by the output of the other DFM (FIG. 5:28). This is done because one orthogonal increment goes from 0 to a maximum, while the other orthogonal increment goes from a maximum to zero. Stated different an instantaneous or continuous tangent (i.e. the vector frequency F$v$) has no component parallel to the $x$ axis at zero degrees, but gradually builds up to a maximum at 90°; the converse is true for the component parallel to the $y$ axis.

Although the RSS term which is calculated before motion begins is, initially, larger than both numerator terms, as motion takes place, one of the modified numerator terms may exceed the value of RSS. This could take place in the first quadrant, for example, in the region 0°–16° and 84°–90°. In order to prevent this happening, the approximate sine and cosine relationship of the DFM ratios can be modified to a tangent and unity relationship, while still maintaining the same ratio of F$x$ to F$y$ since:

sine/cosine = tangent/1

This is done by comparing the numerator terms N$x$, N$y$ (i.e. $\Delta x$, $\Delta y$) with the RSS term. When one of the numerator terms N$x$ or N$y$ becomes equal to or larger than the RSS value, the larger term is used as the denominator of both DFM's 26, 28.

The logic circuitry of FIG. 6 checks the instantaneous numerator N$x$ and N$y$ with the RSS value. This is done by a pair of comparators 30, 32. The output of comparator 30 is applied to NOT gate 34 and to AND gate 36; the output of comparator 32 is applied to NOT gate 38 and AND gate 40. The outputs of the NOT gates 34, 38 are connected to AND gate 44. The output of the AND gates 36, 40, 42 are applied to OR gate 44.

Figure 7:
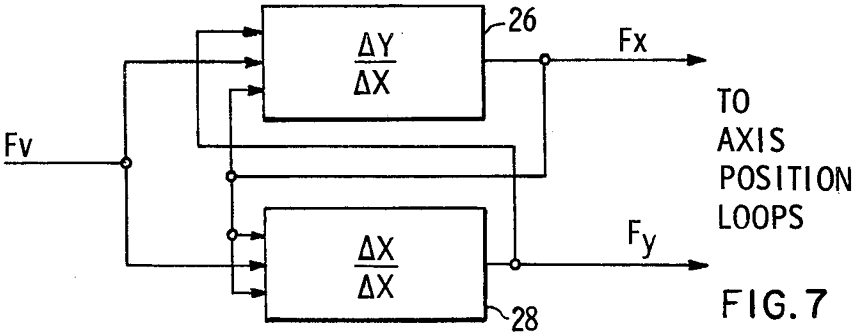
FIG. 7 is a block diagram depicting triganometric frequency multiplication for circular interpolation utilizing the tangent and unity algorithm.

During most of the circular path control N$x$ and N$y$ are less than RSS. The outputs of the comparators are a logic ZERO, and hence AND gate 42 is enabled, passing RSS as the denominator value D. Suppose N$x$ becomes $\geqslant$ RSS. Comparator 30 would output a logic ONE and AND gate 42 would be disabled; however, this logic ONE would enable AND gate 36 passing N$x$ to OR gate 44. The magnitude of the denominator D would now be $\Delta x$ as shown in FIG. 7. Similarly, when Ny $\geqslant$ RSS.

The mode shown in FIG. 5 is called frequency multiplication for circular interpolation using the sine and cosine algorithm; the mode shown in FIG. 7 is frequency multiplication for circular interpolation using the tangent and unity algorithms. This approach can cause some velocity error, but the error will always be less than that caused by the discrepancy between the calculated RSS value and the true vector length, and the transition from the sine and cosine algorithm to tangent and unity algorithm occurs smoothly with no step change in velocity.

A summary of the numerator and denominator register contents for the F$x$ axis and F$y$ axis is shown in the table of FIG. 8. The I and J nomenclature is that adapted by the Electronic Association of Washington, D.C. when programming for circular interpolation. The above description of the trigonometric DFM is based on a machine controlled in one plane, described by the two orthogonal degrees of freedom, but the technique is also applicable for controlling a third axis orthogonal to the other two, by adding another DFM, and modifying the calculation of RSS to include the third dimension.

The trigonometric approach described above provides very accurate vector path control, and vector velocity control accuracy proportional to the degree of accuracy for the RSS calculation. Path accuracy of the DFM is maintained over its full range with an error of less than one increment.

We claim:

1. A frequency multiplication system having a first digital differential analyzer including a numerator shift register N and a denominator shift register D comprising:

means for applying a constant frequency pulse train $fc$ to said first digital differential analyzer;

means for applying a maximum programmed coded input in the form of linear measure per unit time to said N shift register;

means for applying a programmable input $D_1$ to said D shift register which is a function of said maximum programmed coded input to said N register to provide for scale of one-to-one weighted vector output velocity $Fv$, said vector velocity $Fv$ being in accordance with the equation:

$Fv = fc \times N/D$.

2. A frequency multiplication system according to claim 1 comprising:

means, coupled to said programmable input means for modifying the denominator input $D_1$ to provide a new denominator $2D_1$, $4D_1$, etc., which provides variable weighted factors (absolute linear measure per pulse) for said vector output $Fv$.

3. A frequency multiplication system according to claim 1 comprising:

means, coupled to said maximum programmed coded input, for selecting a variable percentage override of said maximum programmed coded input to said D shift register to provide various magnitudes of $D_1$ which are a function of said selected variable feed rate override.

4. A frequency multiplication system according to claim 3 comprising:

means, coupled to said programmable input means, for modifying the variable magnitude $D_1$ to provide new denominators $2D_1$, $4D_1$ etc., which provides variable weighted factors (absolute linear measure per pulse) to said vector output $Fv$.

5. A frequency multiplication system according to claim 1 adapted for linear interpolation along at least two orthogonal axes comprising:

at least second and third digital differential analyzers each having $N_2$, $N_3$ and $D_2$, $D_3$ shift registers respectively;

means for applying the pulse train output $Fv$ to said second and third digital differential analyzers;

means for applying the programmed displacement along the one orthogonal axis to the numerator shift register $N_2$ of said second digital differential analyzer;

means for applying the programmed displacement along the other of said orthogonal axes to the numerator shift register $N_3$ of said third digital differential analyzer; and means for applying the square root of the sum of the squares of said programmed displacements RSS to the shift registers $D_2$, $D_3$ of said second and third digital differential analyzers, whereby the outputs of the second and third digital differential analyzers are respectively:

$F_{along\ one\ orthogonal\ axis} = Fv \times N_2/D_2$ $F_{along\ the\ other\ orthogonal\ axis} = Fv \times N_3/D_3$.

6. A frequency multiplication system according to claim 1 adapted for circular interpolation along at least two orthogonal axes $(x,y)$ comprising:

at least second and third digital differential analyzers each having $N_2$, $N_3$ and $D_2$, $D_3$ shift registers respectively;

means for applying the pulse train output $Fv$ to said second and third digital differential analyzers;

means for applying the programmed displacement $\Delta y$ along one orthogonal axis to the numerator shift register $N_2$ of the second digital differential analyzer;

means for applying the programmed displacement $\Delta X$ along the other of said orthogonal axes to the numerator shift register $N_3$ of said third digital differential analyzer;

means for applying the square root of the sum of the squares of said programmed displacements (RSS) to the shift registers $D_2$, $D_3$ of said second and third digital differential analyzers, whereby the outputs of said second and third differentials $Fx$ and $Fy$ respectively are:

$Fx = \Delta y/RSS \times Fv$;

$Fy = \Delta X/RSS \times Fv$;

means for coupling back $Fx$ to the numerator register $N_3$ of said thir digital differential analyzer to modify the magnitude of $\Delta X$ as circular displacement progresses;

means for coupling back $Fy$ to the numerator register $N_2$ of said second digital differential analyzer to modify the magnitude of $\Delta y$ as circular displacement progresses.

7. A frequency multiplication system according to claim 6 comprising:

means coupled to said shift register $D_2$ and $D_3$ for comparing $\Delta x$ and $\Delta y$ with RSS, for changing the magnitude of RSS to either $\Delta x$ or $\Delta y$ whenever:

$\Delta x \geqslant RSS$ or $\Delta y \geqslant RSS$.

* * * * *